(12) United States Patent
Matsumoto et al.

(10) Patent No.: US 10,001,366 B2
(45) Date of Patent: Jun. 19, 2018

(54) COATING THICKNESS INSPECTION METHOD AND COATING THICKNESS INSPECTION DEVICE

(71) Applicants: FURUKAWA ELECTRIC CO., LTD., Tokyo (JP); FURUKAWA MAGNET WIRE CO., LTD., Tokyo (JP)

(72) Inventors: Yasuhide Matsumoto, Tokyo (JP); Hirohiko Furuta, Tokyo (JP)

(73) Assignees: FURUKAWA ELECTRIC CO., LTD., Tokyo (JP); FURUKAWA MAGNET WIRE CO., LTD., Tokyo (JP)

(*) Notice: Subject to any disclaimer, the term of this patent is extended or adjusted under 35 U.S.C. 154(b) by 95 days.

(21) Appl. No.: 15/028,377

(22) PCT Filed: Oct. 10, 2014

(86) PCT No.: PCT/JP2014/005189
§ 371 (c)(1),
(2) Date: Apr. 8, 2016

(87) PCT Pub. No.: WO2015/052941
PCT Pub. Date: Apr. 16, 2015

(65) Prior Publication Data
US 2016/0258740 A1 Sep. 8, 2016

(30) Foreign Application Priority Data
Oct. 11, 2013 (JP) .................. 2013-213853

(51) Int. Cl.
*G01B 21/00* (2006.01)
*G01B 11/06* (2006.01)
*G01B 11/24* (2006.01)

(52) U.S. Cl.
CPC ...... *G01B 11/0616* (2013.01); *G01B 11/0691* (2013.01); *G01B 11/24* (2013.01)

(58) Field of Classification Search
CPC . G01B 7/02; G01B 7/105; G01B 7/28; G01B 7/12; G01B 11/0691;
(Continued)

(56) References Cited

U.S. PATENT DOCUMENTS 6,975,410 B1 * 12/2005 Sturgill .................. G01B 11/06
356/631
7,564,552 B2 * 7/2009 Fielden ............... G03F 7/70916
356/364
(Continued)

FOREIGN PATENT DOCUMENTS

| JP | S5220282 A | 2/1977 |
| JP | H03291505 | 12/1991 |

(Continued)

OTHER PUBLICATIONS

International Search Report dated Jan. 13, 2015 for PCT Application No. PCT/JP2014/005189, 4 pages.

*Primary Examiner* — Hoa Pham
(74) *Attorney, Agent, or Firm* — Amin, Turocy & Watson, LLP

(57) ABSTRACT

A coating thickness inspection device (20) is provided with: a displacement gauge (25); a position calculation unit (28a); and a determination unit (28b). The displacement gauge (25) measures the external shape of a rectangular wire (30) across the lengthwise direction thereof (external shape measurement step). The position calculation unit (28a) determines the position of a rectangular conductor (31) within the rectangular wire (30) across the lengthwise direction of the rectangular wire (30) (position calculation step). The determination unit (28b) determines whether the thickness across the peripheral direction of a coating section (32) as calculated on the basis of the results obtained by the displacement gauge (25) and the position calculation unit (28a) satisfies a (Continued)

standard thickness across the lengthwise direction of the rectangular wire (30) (determination step).

15 Claims, 7 Drawing Sheets

(58) Field of Classification Search
CPC .... G01B 11/0616; G01B 11/24; G01B 15/02; G01B 15/04; G01B 5/06; G01B 5/066; G01B 5/068
USPC .................................. 356/630–632, 601–623
See application file for complete search history.

(56) References Cited

U.S. PATENT DOCUMENTS

| | | | | |
|---|---|---|---|---|
| 7,903,265 B2* | 3/2011 | Clayson | ................. | G01B 21/08 356/630 |
| 8,988,668 B2* | 3/2015 | Kurokawa | ............. | G01B 5/205 356/72 |
| 2004/0131148 A1* | 7/2004 | Fischer | .................. | G01B 15/02 378/50 |
| 2010/0203231 A1* | 8/2010 | Kusaka | .................. | H01B 3/301 427/9 |
| 2017/0284788 A1* | 10/2017 | Kannaka | .................. | G01B 7/28 |

FOREIGN PATENT DOCUMENTS

| | | |
|---|---|---|
| JP | H10227747 A | 8/1998 |
| JP | H11185554 A | 7/1999 |
| JP | 2003156313 A | 5/2003 |
| JP | 2005123116 A | 5/2005 |
| JP | 2007214042 A | 8/2007 |
| JP | 2013020742 A | 1/2013 |
| JP | 2013045624 A | 3/2013 |
| WO | 2008126375 A1 | 10/2008 |
| WO | WO 2013/031583 A1 * | 3/2013 |

* cited by examiner

COATING THICKNESS INSPECTION METHOD AND COATING THICKNESS INSPECTION DEVICE

CROSS-REFERENCE TO RELATED APPLICATIONS

This patent application is a U.S. National Stage filing under 35 USC § 371 of international Patent Cooperation Treaty (PCT) Application No. PCT/JP2014/005189, filed on Oct. 10, 2014, and entitled "COATING THICKNESS INSPECTION METHOD AND COATING THICKNESS INSPECTION DEVICE," which claims priority to Japanese Patent Application No. 2013-213853, filed on Oct. 11, 2013, both of which applications are hereby incorporated by reference herein in their respective entireties.

TECHNICAL FIELD

The present invention relates mainly to a method for inspecting the thickness of a coating section of a rectangular wire across the lengthwise direction and the peripheral direction.

BACKGROUND ART

In recent years, a rectangular wire has been used for electric equipment such as an automotive motor and the like. The rectangular wire is a wire in which a coating section is formed around a rectangular conductor having a rectangular cross-section. As the rectangular wire has a high space factor compared to a wire having a circular cross-section, miniaturization of the equipment and high output can be realized. Patent Document 1 and 2 disclose the technology related to a rectangular wire.

Patent Document 1 discloses a method for manufacturing a rectangular wire. Specifically, a method for forming a coating section by passing through a rectangular conductor inside a tank filled with an insulating varnish and then heated to harden the insulating varnish is disclosed in Patent Document 1. Furthermore, a method for forming a coating section by spraying an insulating varnish and then heated to harden the insulating varnish is disclosed in Patent Document 1.

Patent Document 2 discloses a method for forming a uniform coating section for the purpose of improving the space factor and the like. Specifically, a coating die for forming a coating section includes 4 die parts disposed along the 4 sides of a rectangular conductor. Each of the die parts applies insulating varnish to the rectangular conductor by spraying the insulating varnish from a groove formed on the die part. With respect to each die part, a groove formed at an opposite plane of the corner region (the region on which dog bone is formed) is small. Because of this configuration, applying too much insulating varnish on the corner region of the rectangular conductor can be prevented, and the coating section can be formed uniformly.

PRIOR-ART DOCUMENTS

Patent Documents

Patent Document 1: Japanese Patent Application Laid-Open No. 2013-45624
Patent Document 2: Japanese Patent Application Laid-Open No. 2013-20742

SUMMARY OF THE INVENTION

Problems to be Solved by the Invention

Since a rectangular conductor is a long object and thus positioning deviation occurs easily, the thickness of a coating section thereof becomes partially increased or decreased easily. As such, even when the method of Patent Document 2 is used, it is difficult to reliably control the thickness of the coating section.

Accordingly, inspection of the thickness of a coating section of a rectangular wire is performed conventionally. As this inspection method, cutting the end section of a rectangular wire to measure the thickness of a coating section, or measuring the thickness of a coating section at one point of the rectangular wire across the lengthwise direction thereof by a film thickness gauge and the like is conventionally performed.

However, according to the former inspection method, only a part in the lengthwise direction of the rectangular wire is measured. According to the latter inspection method, only a part in the peripheral direction of the rectangular wire is measured. That is to say, according to the conventional method, measurement is performed only partially. As such, the quality of the rectangular wire cannot be reliably guaranteed.

The present invention has been made in view of the circumstances described above, and a primary object of the present invention is to provide a method for inspecting the thickness of a coating section of the rectangular wire across lengthwise direction and peripheral direction thereof.

Means for Solving the Problems and Effects Thereof

Problems to be solved by the present invention are as described above, and next, means for solving the problems and effects thereof will be described.

In a first aspect of the present invention, a following method for inspecting the thickness of a coating section is provided. That is, the method for inspecting the thickness of the coating section includes an external shape measurement step, a position calculation step, and a determination step. In the external shape measuring step, an external shape of a rectangular wire across a lengthwise direction of the rectangular wire is measured. In the position calculation step, the position of a rectangular conductor within the rectangular wire across the lengthwise direction of the rectangular wire is determined. In the determination step, whether the thickness across a peripheral direction of the coating section as calculated on the basis of results obtained by the external shape measurement step and the position calculation step satisfies a standard thickness across the lengthwise direction is determined.

Accordingly, whether the thickness of the coating section across the lengthwise direction and the peripheral direction of the rectangular wire satisfies the standard thickness can be inspected. As such, highly reliable rectangular wire securing sufficient insulation properties can be provided.

It is preferable that the method for inspecting the thickness of the coating section is configured as follows. That is, a thickness measurement step for measuring the thickness of the coating section at at least one point per each of the four sides of the rectangular wire, looking the rectangular conductor from the lengthwise direction of the rectangular wire, is included. In the position calculation step, the measurement result of the thickness measurement step is utilized to the calculation.

Accordingly, the position of the rectangular conductor can be calculated precisely by utilizing a film thickness gauge and the like capable of measuring the thickness of the coating section at a predetermined point.

In the above method for inspecting the thickness of the coating section, it is preferable that, in the thickness measurement step, measurement of the thickness of the coating section is performed at an evading position above swelling portions that are formed on four corners of the coating section of the rectangular wire.

Accordingly, the thickness of the coating section can be measured precisely.

In the above method for inspecting the thickness of the coating section, it is preferable that, in the thickness measurement step, the thickness of the coating section is measured at at least two points for one side among the four sides of the rectangular wire.

Accordingly, the inclination can be detected even if the rectangular conductor is inclined relative to the rectangular wire. As such, since the position of the rectangular conductor can be measured more precisely, whether the thickness of the coating section satisfies the standard thickness can be determined more precisely.

In the above method for inspecting the thickness of the coating section, it is preferable that, in the thickness measurement step, laser is irradiated onto the rectangular wire in dots so that the thickness of the coating section is measured.

Accordingly, the thickness of the coating section at a predetermined point can be measured quickly and precisely so that the position of the rectangular conductor can be calculated.

In the above method for inspecting the thickness of the coating section, it is preferable that, in the thickness measurement step, the thickness of the coating section is measured by a thickness measurement part while moving the rectangular wire along the lengthwise direction.

Accordingly, the thickness of the coating section can be measured across the lengthwise direction of the rectangular wirer without moving the measuring part.

In the above method for inspecting the thickness of the coating section, it is preferable that the position of the at least one of the thickness measurement parts in the lengthwise direction is different from that of any of the rest of the thickness measurement part.

In the above method for inspecting the thickness of the coating section, it is preferable that timing of irradiating laser from the at least one of the thickness measurement parts is different from that of any of the rest of the thickness measurement part.

Accordingly, the apprehension that the laser irradiated from a thickness measurement part is detected by another thickness measurement part is prevented and thereby detection accuracy of the thickness of the coating section can be improved.

In the above method for inspecting the thickness of the coating section, it is preferable that, looking from the lengthwise direction, with regard to lasers irradiated onto the long sides of the rectangular wire from the thickness measurement parts, the directions of irradiation of lasers are parallel to each other, and with regard to lasers irradiated onto the short sides of the rectangular wire from the thickness measurement parts, the directions of irradiation of lasers are parallel to each other, and lasers irradiated onto the long sides and lasers irradiated onto the short sides are perpendicular to each other.

In time of inspecting the thickness of a coating section of a circular wire, the irradiation directions count for nothing as long as lasers are irradiated toward the center of the circular wire. In this respect, in time of inspecting the rectangular wire, depending on the irradiation direction of laser, there are some cases where the thickness of the coating section cannot be calculated accurately. As such, by irradiating laser as described above, the thickness of the coating section can be measured accurately.

In the above method for inspecting the thickness of the coating section, it is preferable that, in the external shape measurement step, the external shape of the rectangular wire is measured by irradiating lasers to the four sides of the rectangular wire in lines from external shape measurement parts, while moving the rectangular wire in the lengthwise direction.

Accordingly, the external shape of the rectangular wire can be measured quickly and precisely.

In the above method for inspecting the thickness of the coating section, it is preferable that the position of the at least one of the external shape measurement parts in the lengthwise direction is different from that of any of the rest of the external shape measurement part.

In the above method for inspecting the thickness of the coating section, it is preferable that timing of irradiating laser from the at least one of the external shape measurement parts is different from that of any of the rest of the external shape measurement part.

Accordingly, the apprehension that the laser irradiated from a thickness measurement part is detected by another thickness measurement part is prevented and thereby detection accuracy of the thickness of the coating section can be improved.

In the above method for inspecting the thickness of the coating section, it is preferable that, looking from the lengthwise direction, with regard to lasers irradiated onto the long sides of the rectangular wire from the external shape measurement parts, the directions of irradiation of lasers are parallel to each other, and with regard to lasers irradiated onto the short sides of the rectangular wire from the external shape measurement parts, the directions of irradiation of the lasers are parallel to each other, and lasers irradiated onto the long sides and lasers irradiated onto the short sides are perpendicular to each other.

Accordingly, taking the fact that the rectangular wire has a rectangular shape into consideration, by means of irradiating lasers perpendicular to each face as above, the shape of each face can be measured precisely. As such, the thickness of the coating section across the lengthwise direction and peripheral direction can be measured precisely.

In the above method for inspecting the thickness of the coating section, it is preferable that, among four pairs of the thickness measurement parts and the external shape measurement parts that are intended to measure the same side of the rectangular wire, with regard to the at least one of the pairs, the thickness measurement part and the external shape measurement part are fixed so as not to be relatively movable.

Accordingly, the positional relationship between the thickness measurement part and the external shape measurement part is fixed. Therefore, deviation that arose in superimposing the detection results of the both can be reduced, and the thickness of the coating section can be measured precisely.

In the above method for inspecting the thickness of the coating section, it is preferable that the external shape measurement step, the position calculation step, and the determination step are performed with a manufacturing step of the rectangular wire in a series of flow.

Accordingly, in the present application, measurement of the rectangular wire is performed across the lengthwise direction. By means of performing such inspection with the manufacturing step in a series of flow, inspection can be performed efficiently.

In a second aspect of the present invention, a following device for inspecting the thickness of a coating section is provided. That is, the devise for inspecting the thickness of the coating section includes an external shape measurement part, a position calculation part, and a determination part. The external shape measurement part measures an external shape of the rectangular wire across a lengthwise direction of the rectangular wire. The position calculation part determines the position of the rectangular conductor within the rectangular wire across the lengthwise direction of the rectangular wire. The determination part determines whether the thickness across a peripheral direction of the coating section as calculated on the basis of the results obtained by the external shape measurement part and the position calculation part and the size of the rectangular conductor satisfies a standard thickness across the lengthwise direction.

Accordingly, whether the thickness of the coating section across the lengthwise direction and the peripheral direction of the rectangular wire satisfies the standard thickness can be inspected. As such, highly reliable rectangular wire securing sufficient insulation properties can be provided.

BRIEF DESCRIPTION OF THE DRAWINGS

FIG. 4 A figure illustrating a process of calculating the thickness of a coating section on the basis of measurement results and the like.

EMBODIMENT FOR CARRYING OUT THE INVENTION

Next, an embodiment of the present invention will be described with reference to the drawings.

Figure 1:
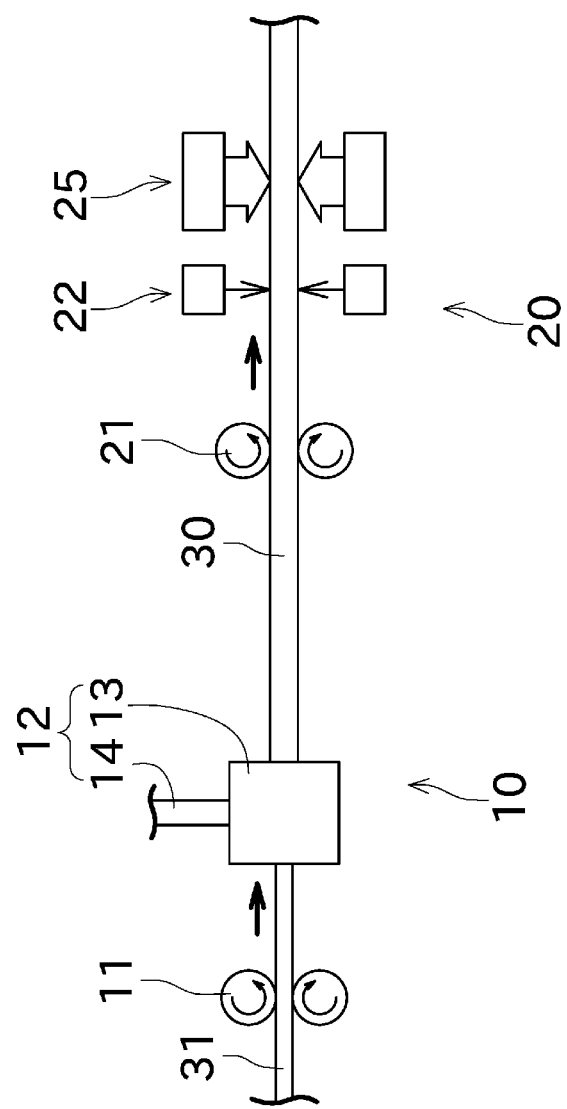
FIG. 1 A side view schematically illustrating a rectangular wire manufacturing device and a coating thickness inspection device according to an embodiment of the present invention.

First of all, an explanation will be given of a rectangular wire manufacturing device 10 with reference to FIG. 1. The rectangular wire manufacturing device 10 is a device for manufacturing a rectangular wire 30 from a rectangular conductor 31. The rectangular wire manufacturing device 10 includes at least one conveyance roller 11 and a coating forming part 12.

Figure 2:
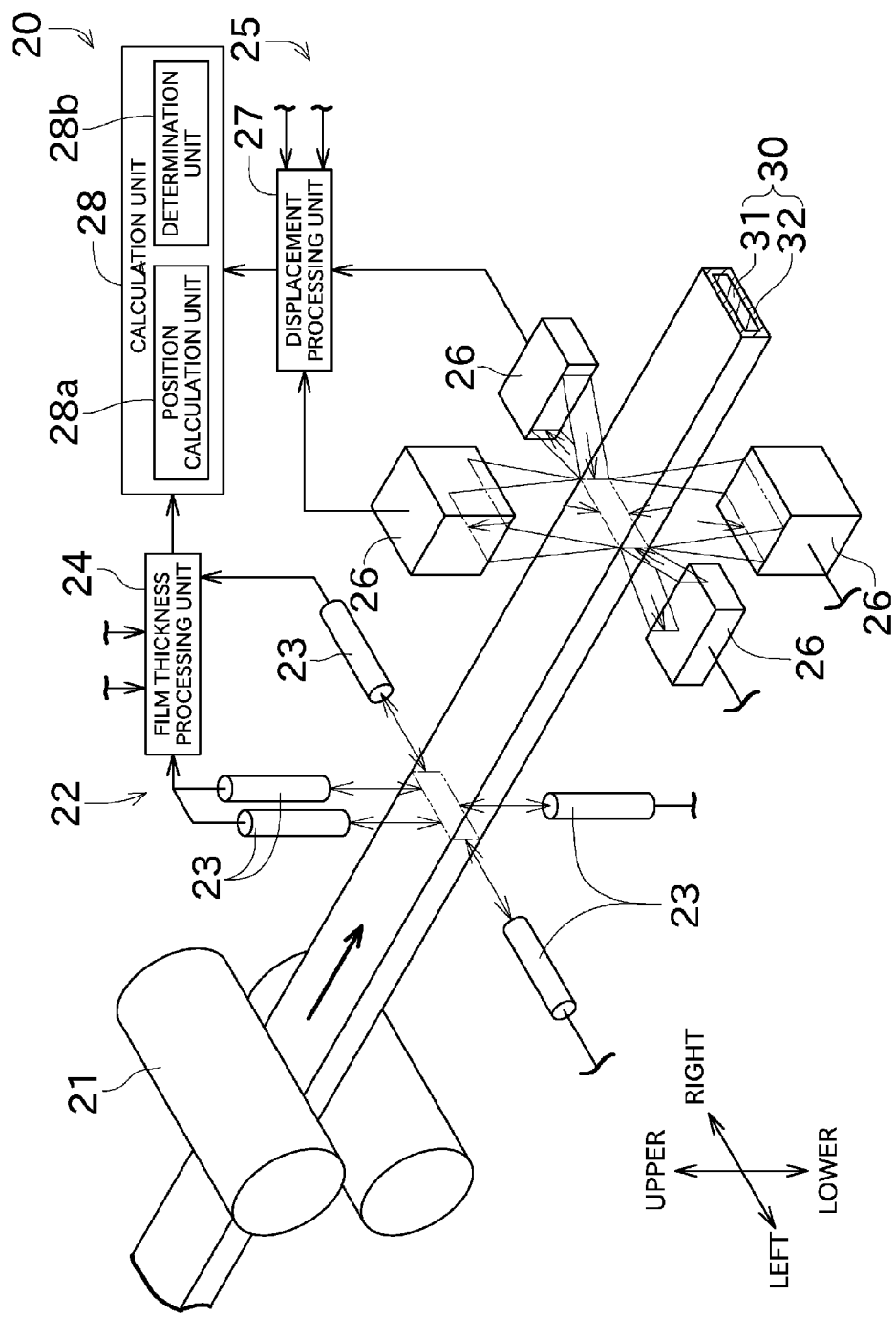
FIG. 2 A perspective view and a block diagram illustrating the specific configuration of the coating thickness inspection device.

As shown in FIG. 2 etc., the rectangular conductor 31 is a long wire having a rectangular-shaped cross-section. The rectangular conductor 31 of this embodiment is made of copper, however, any other material can be used as long as the material is a conductor. In this Specification, not only rectangular-shape but also square-shape is included in "rectangular-shape". Moreover, rectangular-shape, four corners of which have circular arc shapes, is also included in "rectangular-shape".

The conveyance roller 11 includes two cylindrical-shaped members disposed to face each other. The conveyance roller 11 rotates by sandwiching the rectangular conductor 31 so that the rectangular conductor 31 is conveyed in a direction shown with thick arrows in FIG. 1. Only one pair of the conveyance rollers 11 is shown in FIG. 1, however, a plurality of conveyance rollers 11 are arranged in practice.

The coating forming part 12 forms a coating section 32 around the rectangular conductor 31. The coating forming part 12 includes an at least one die 13 and an at least one screw cylinder 14. A penetration section for inserting the rectangular conductor 31 is formed in the die 13. The die 13 applies resin supplied from the screw cylinder 14 to the periphery of the rectangular conductor 31.

As described above, the coating section 32 is formed around the rectangular conductor 31 and thereby the rectangular wire 30 is manufactured. The coating section 32 of this embodiment is made of PPS (polyphenylene sulfide). However, any other resin, for example, such as PEEK (polyetheretherketone) and the like, can be used for the coating section 32. The coating section 32, formed as above mentioned, may include at least one swelling portion 32a that is called a dog-bone as shown in FIG. 3(a).

Next, referring mainly to FIG. 2, an explanation will be given of a coating thickness inspection device 20. In the following explanation, up the vertical and lateral directions are defined as shown in FIG. 2 for convenience of explanation.

The coating thickness inspection device 20 inspects whether the thickness of the coating section 32 of the rectangular wire 30 manufactured by the rectangular wire manufacturing device 10 satisfies a standard thickness in a series of flow. In this embodiment, the standard thickness is a thickness capable of ensuring insulation of the rectangular wire 30. As shown in FIG. 1 and FIG. 2, the coating thickness inspection device 20 includes an at least one conveyance roller 21, a film thickness gauge 22, a displacement gauge 25, and a calculation unit 28.

In the same way as the conveyance roller 11, the conveyance roller 21 includes two cylindrical-shaped members disposed to face each other. The conveyance roller 21 rotates by sandwiching the rectangular wire 30 so that the rectangular wire 30 is conveyed in a direction shown with thick arrows in FIG. 1. Only one pair of the conveyance rollers 21 is shown in FIG. 1, however, a plurality of conveyance rollers 21 are arranged in practice.

The film thickness gauge 22 is a device for measuring the film thickness (in this embodiment, the thickness of the coating section 32) by irradiating light onto the surface in dots from an at least one optical equipment and analyzing the reflected light. The film thickness gauge 22 includes a plurality of film thickness detecting units (thickness measuring units) 23 and a film thickness processing unit 24. In this embodiment, a laser equipment is used as the optical equipment so that the film thickness can be measured quickly and precisely.

The film thickness gauge 22 includes five film thickness detecting units 23. The five film thickness detecting units 23 respectively have the same configuration. The film thickness detecting unit 23 is a long and narrow member, having an irradiator capable of irradiating laser onto the surface in dots and a light receiver capable of receiving reflected light arranged on one end side surface thereof. With regard to the film thickness detecting units 23 of this embodiment, the film thickness detecting units 23 are arranged one on each side (each face) of the rectangular wire 30 having the rectangular shaped cross-section, so that the films thickness detecting units 23 are arranged in such a manner that the irradiator and the light receiver thereof are facing toward each face of the rectangular wire 30. Furthermore, another film thickness detecting unit 23 is arranged to face one of the four side (specifically, the upper side). Accordingly, the thickness of the coating section 32 is precisely measured by measuring at two points on one of the side (as will hereinafter be described in detail). For the lower side, the left side, and the right side, in which measurement is performed at one point per one side, laser is irradiated toward approximately the center of each side.

Irradiation position to which laser is irradiated from the film thickness detecting unit 23 is not limited to approximately the center portion of the side. However, the irradiation position may preferably be a position of a part of the surface of the coating section 32 where the rectangular conductor 31 is arranged linearly inside the coating section 32. Furthermore, the irradiation position may preferably be an evading position above the swelling portions 32a shown in FIG. 3(a). Specifically, taking the general size of the swelling portions 32a and the rectangular wire 30 into consideration, it is preferable that measurement be performed at a position within 35% (more preferably, within 30%) of the length of the side from the center to the opposite ends of the side. For example, in the case where the rectangular wire 30 has a rectangular-shaped cross-section perpendicular to the longitudinal direction thereof, and the long sides of the cross-section have the length of 4 mm (including the swelling portions 32a), it is preferable that measurement be performed at a position in the region from the center to a distance of 2.8 mm or 2.4 mm. In particular, as for this embodiment, measurement at two points on the upper side is performed, and keeping the respective measuring point apart in some degree is necessary. Therefore, it is preferable to determine measuring points in consideration of the above mentioned range. Thus, the thickness of the coating section 32 can be detected more precisely. For example, measurement may be performed at position 1.2 mm from the center of one side of the rectangular wire 30 to the opposite ends.

Figure 3:
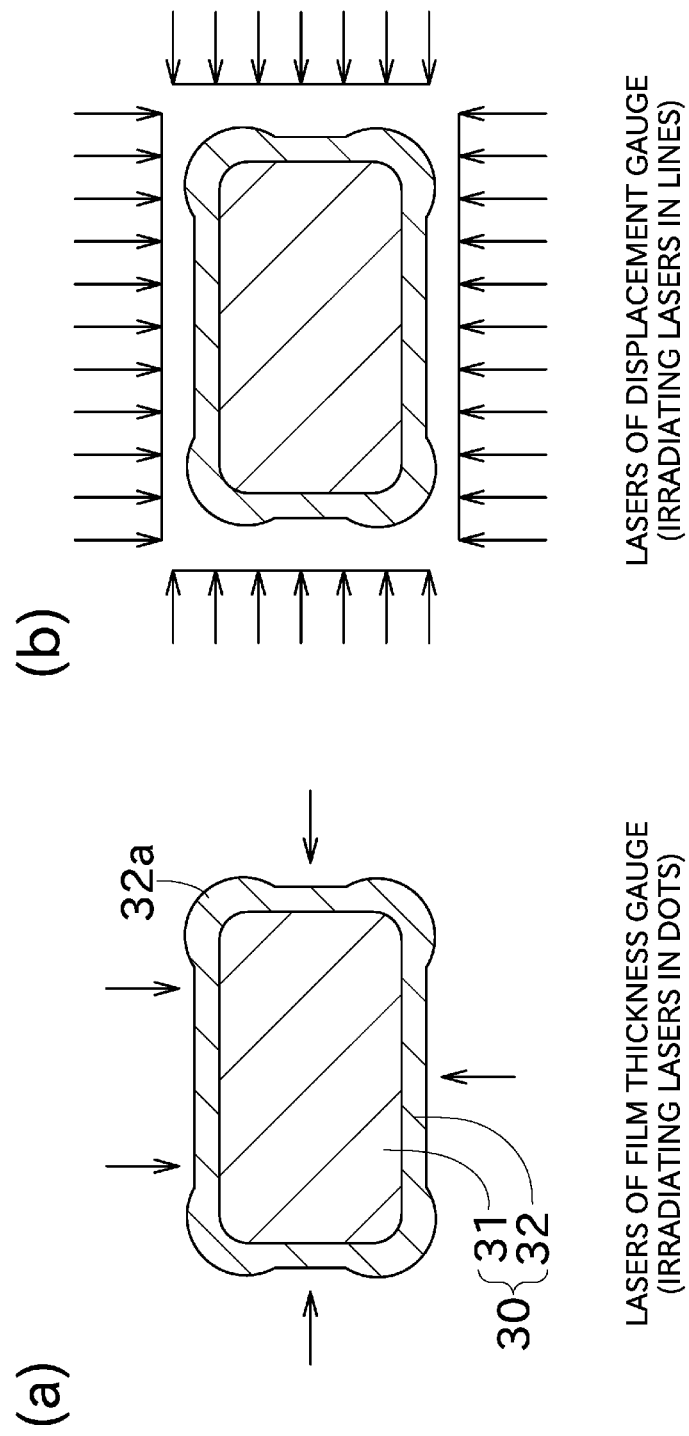
FIG. 3 A figure illustrating a cross-sectional shape of a rectangular wire and a laser irradiated by a film thickness gauge and a displacement gauge.

As shown in FIG. 2 and FIG. 3, the five film thickness detecting units 23 respectively irradiate laser vertically onto the surface of the rectangular wire 30. Accordingly, as shown in FIG. 3, looking from the lengthwise direction of the rectangular wire 30, laser irradiated from the film thickness detecting units 23 that are arranged vertically are parallel with one another. Also, laser irradiated from the film thickness detecting units 23 that are arranged left and right are parallel with one another. Furthermore, laser irradiated from the film thickness detecting units 23 that are arranged vertically and laser irradiated from the film thickness detecting units 23 that are arranged left and right are perpendicular to one another. The word parallel and perpendicular used here include cases in which margin of error of for example 2 or 3 degrees is present. These plurality of film thickness detecting units 23 arranged parallel with or perpendicular to one another are set to positions determined by the relative positions relationship relative to a reference face, defining one of faces as the reference face, so as to face each periphery surface of the rectangular wire. This reference face can be defined arbitrary. For example, setting a sample made in the same size as the rectangular wire 30 onto the supporting/conveying members (the conveyance roller 21 and the conveyance rollers not shown) of the rectangular wire 30 and then defining the surface of the sample as a reference face is possible. In such a manner, the accuracy of the positions of the film thickness detecting units 23 relative to the rectangular wire 30 and physical relationship between the film thickness detecting units 23 are improved by determining positions of the film thickness detecting units 23 based on the reference face corresponding to the surface of the rectangular wire 30 that is conveyed. Setting the rectangular wire 30 onto the supporting/conveying members instead of the sample and defining the surface of the rectangular wire 30 as the reference face is also possible.

The film thickness detecting unit 23 irradiates laser on the rectangular wire 30 that is conveyed in dots, and receives reflected wave of the irradiated laser and transfers it into an electric signal, and outputs the electric signal to the film thickness processing unit 24. The reflected waves include reflection wave reflected on the surface of the rectangular wire 30 (coating section 32) and reflection wave reflected on the surface of the rectangular conductor 31.

The film thickness processing unit 24 calculates the distance of reaching the two reflection positions respectively by analyzing the reflected waves. The film thickness processing unit 24 is capable of calculating the thickness of the coating section 32 based on the deviation of these distance. The results of calculating the thickness of the coating section 32 indicate the thickness at each of the five points irradiated by the film thickness detecting unit 23. That is, the results does not indicate the thickness of the coating section 32 across the peripheral direction thereof though it is the purpose of the present invention.

The film thickness detecting unit 23 irradiates laser and receives light at a predetermined sampling period. As such, the film thickness gauge 22 is capable of measuring the thickness of the coating section 32 at five points nondestructively across the lengthwise direction of the rectangular wire 30 throughout its length (to be exact, intervals between the sampling period are eliminated, the same hereinafter). The details of utilization of the measured thickness of the coating section 32 will be described later. The detection result of the film thickness gauge 22 is outputted to the calculation unit 28.

The displacement gauge 25 is a device for measuring the external shape of an object (in this embodiment, the external shape of the rectangular wire 30) by irradiating laser onto the surface as a line and analyzing the reflected wave (diffused reflection light). The displacement gauge 25 includes an at least one displacement detecting unit (external shape measuring unit) 26 and a displacement processing unit 27.

The displacement gauge 25 includes four displacement detecting units 26. The displacement detecting units 26 are arranged one on each of the four sides (four faces) of the rectangular wire 30. An irradiation part capable of irradiating laser on surface as a line and a light receiving part capable of receiving reflected wave are arranged on a predetermined face of the respective displacement detecting units 26. Two of the four displacement detecting units 26, which are arranged vertically to the rectangular wire 30, are configured in such a manner that the spot diameter of laser is set larger than the left/right directional length of the side of the rectangular wire 30 by means of a lens. Two of the four displacement detecting units 26, which are arranged left and right to the rectangular wire 30, are configured in such a manner that the spot diameter of laser is set larger than the thickness directional (perpendicular) length of the side of the rectangular wire 30 by means of a lens. Each displacement detecting unit 26 has the same configuration except for the spot diameter of the lens. In this embodiment, different spot diameter is set in vertical direction and left/right direction, however, instead of this configuration, the spot diameter of a longer one among vertical direction and left/right direction may be set to the four laser so as to perform measurement.

As shown in FIG. 2 and FIG. 3, each of the four displacement detecting units 26 is configured in such a manner that laser is irradiated vertically onto the surface of the rectangular wire 30. Accordingly, as shown in FIG. 3, when looking from the lengthwise direction of the rectangular wire 30, laser irradiated from the displacement detecting units 26 that are arranged vertically are parallel to each other. Also, laser irradiated from the displacement detecting units 26 that are arranged left and right are parallel to each other. Furthermore, laser irradiated from the displacement detecting units 26 that are arranged vertically and laser irradiated from the displacement detecting units 26 that are arranged left and right are perpendicular to each other. More specifically, a certain face is defined as a reference face, and the positions of the displacement detecting units 26 are set on the basis of the relative positions relationship relative to the reference face. As already mentioned above, this reference face can be defined by using sample and the like of the rectangular wire 30.

The displacement detecting unit 26 irradiates laser toward the conveying rectangular wire 30 as a line, receives the reflection wave of the irradiated laser and transfer it to an electric signal, and outputs the electric signal to the displacement processing unit 27. For example, in the case where a part of the rectangular wire 30 is swelled, reflection wave of the laser irradiated onto the part is received by the unit 26 earlier than other light.

The displacement processing unit 27 calculates the external shape of the four side of the rectangular wire 30 respectively on the basis of the time from irradiation of laser to receiving the reflected wave. As such, the external shape around the rectangular wire 30 is measured.

The displacement detecting unit 26 irradiates laser and receives light at a predetermined sampling period. As such, the displacement gauge 25 is capable of measuring the external shape around the rectangular wire 30 nondestructively across the full length of the rectangular wire 30. The detection result of the displacement gauge 25 is outputted to the calculation unit 28.

The calculation unit 28 performs calculation on the basis of the measurement results of the film thickness gauge 22 and the displacement gauge 25. Since the film thickness detecting units 23 and the displacement detecting units 26 are disposed at different positions in the lengthwise direction of the rectangular wire 30, the following procession is performed by the calculation unit 28. That is, the calculation unit 28 calculates how long it takes from the time when a part of the rectangular wire 30 passes through the film thickness detecting units 23 to the time when the said part of the rectangular wire 30 passes through the displacement detecting units 26 on the basis of the conveyance velocity of the rectangular wire 30 and the distance from the film thickness detecting units 23 to the displacement detecting units 26. Taking this time into consideration, the measurement result of the film thickness gauge 22 and the measurement result of the displacement gauge 25 which correspond to the same part of the rectangular wire 30 can be used.

The calculation unit 28 includes a position calculation unit 28a and a determination unit 28b.

Figure 4:
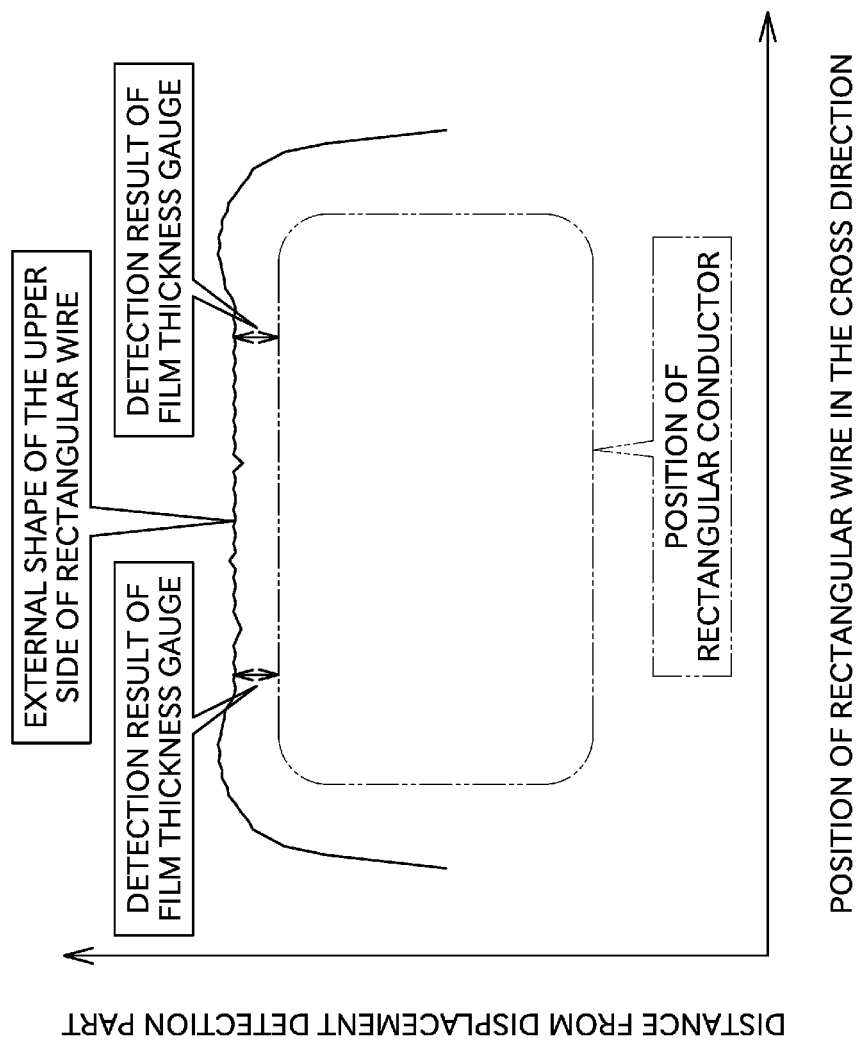

The position calculation unit 28a calculates the position of the rectangular conductor 31. Hereinafter, a specific explanation will be given with reference to FIG. 4. The solid line in the graph of FIG. 4 illustrates the external shape of the rectangular wire 30 detected by the displacement detecting unit 26 arranged on the upper side of the rectangular wire 30. The thickness of the coating section 32 at a measuring point is measured by the film thickness detecting units 23 arranged on upper side of the rectangular wire 30. Accordingly, it is understood that the rectangular conductor 31 is positioned by the thickness of the coating section 32 measured downward from the external shape of the rectangular wire 30. The position of the rectangular conductor 31 can be calculated by applying the same process to the four sides of the rectangular wire 30. In this embodiment, with respect to the lower side, the left side, and the right side, where measurement is performed at one point, the thickness the coating section 32 at approximately the center of each side is measured.

Figure 5:
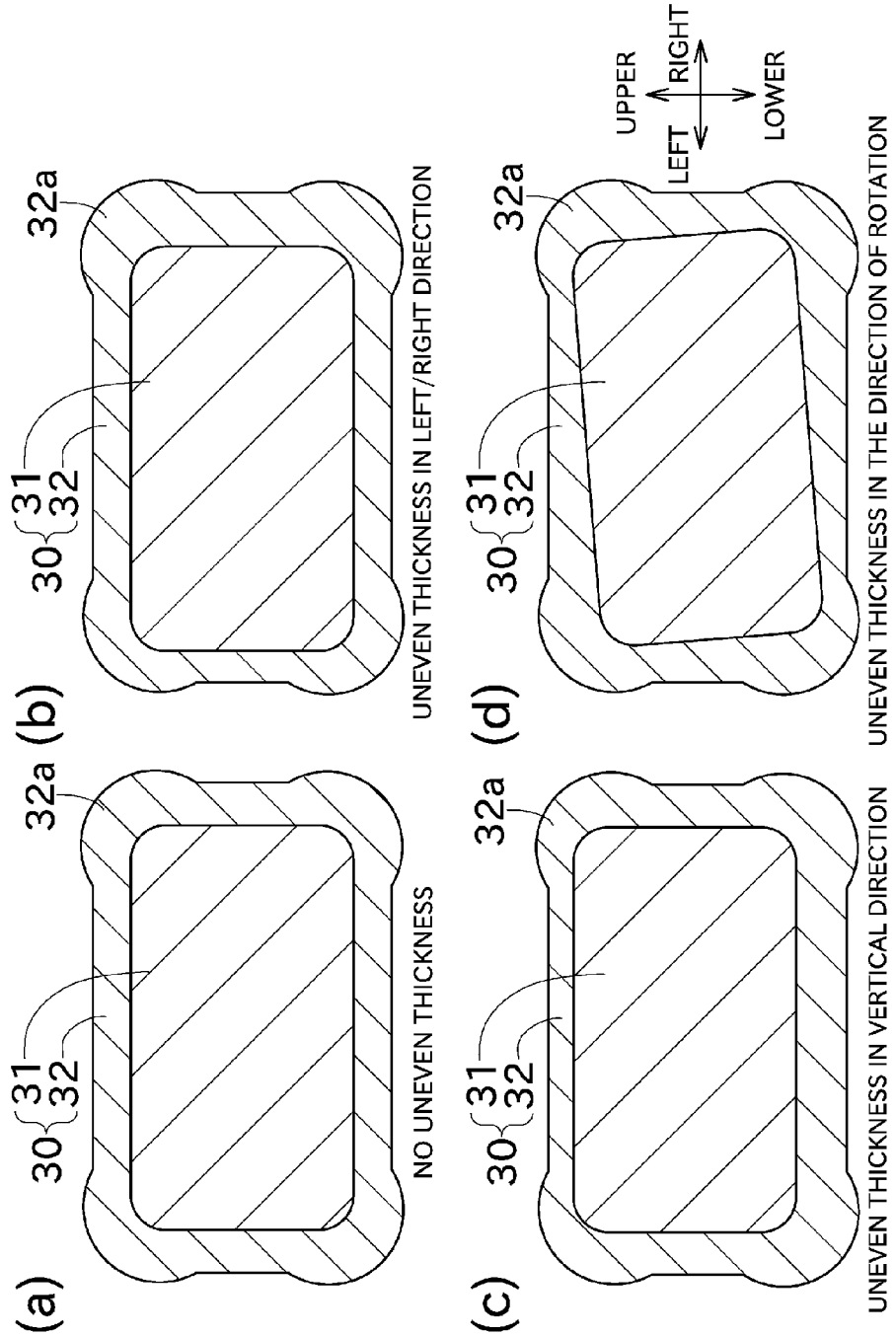
FIG. 5 A figure illustrating a pattern of thickness deviation of the rectangular conductor.

An uneven thickness of the coating section 32 can be detected by calculating the position of the rectangular conductor 31. Hereinafter, an explanation will be given with reference to FIG. 5. FIG. 5(a) illustrates a cross-sectional view of the rectangular wire 30 when uneven thickness is not produced.

FIG. 5(b) illustrates a cross-sectional view of the rectangular wire 30 when uneven thickness is produced in the left/right direction. The uneven thickness in the left/right direction can be detected by the film thickness detecting units 23 arranged on left and right. FIG. 5(c) illustrates a cross-sectional view of the rectangular wire 30 when uneven thickness is produced in the vertical direction. The uneven thickness in the vertical direction can be detected by the film thickness detecting units 23 arranged vertically.

FIG. 5(d) illustrates a cross-sectional view of the rectangular wire 30 when uneven thickness is produced in the direction of rotation. The uneven thickness in the direction or rotation can be detected considering the measurement results of the two film thickness detecting units 23 arranged on upper side. As such, the condition of uneven thickness can be precisely detected by measuring the thickness of the coating section 32 at two points on one side of the rectangular wire 30. In the case where the rectangular conductor 31 has a rectangular shape, it is preferable to detect the thickness of the coating section 32 at two points on the long sides of the rectangle.

The determination unit 28b calculates the thickness of the coating section 32 over the entire lengthwise length of the rectangular wire 30 in the lengthwise direction and over the whole circumference length of the rectangular wire 30 in the peripheral direction on the bases of the external shape of the rectangular wire 30 measured by the displacement gauge 25, the position of the rectangular conductor 31 calculated by the position calculation unit 28a, and the size of the rectangular conductor 31, and determines whether the calculated thickness satisfies a standard thickness. Hereinafter, an explanation will be given specifically.

With regard to the graph of FIG. 4, the value obtained by subtracting the external shape of the rectangular conductor 31 from the external shape of the rectangular wire 30 corresponds to the thickness of the coating section 32. As such, the determination unit 28b is capable of determining the thickness of all parts of the coating section 32 formed on the upper side. The determination unit 28b is capable of calculating the coating section 32 over the whole circumference of the rectangular wire 30 in the peripheral direction by applying the same process to other three sides of the rectangular wire 30. Since the film thickness gauge 22 and the displacement gauge 25 performs measurement over the entire lengthwise length of the rectangular wire 30 in the lengthwise direction, the determination unit 28b is capable of calculating the thickness of the coating section 32 over the entire lengthwise length and the whole circumference length of the rectangular wire 30. The four sides of the rectangular conductor 31 is considered as being perpendicular to each other. As such, it is also possible to calculate the thickness of the coating section 32 over the entire lengthwise length and the whole circumference length in such a manner that, instead of using the size of the rectangular conductor 31, positions (five points) of the rectangular conductor 31 is detected by the five film thickness gauges and the positions are connected so as to form right angles with the four sides.

In the case where there are four film thickness detecting units 23 and positions of four points (one point on each of the four sides) of the rectangular conductor 31 are measured, the thickness of the coating section 32 over the entire lengthwise length and the whole circumference length is influenced by the precision of the size of the rectangular conductor 31. In such a case, the precision of the size of the external shape of the rectangular conductor 31 can be improved by measuring the size of the external shape of the rectangular conductor 31 and then giving feedback on processing the rectangular conductor 31. With these means, the thickness of the coating section 32 over the entire lengthwise length and the whole circumference length can be calculated precisely.

The determination unit 28b determines whether the thickness of the coating section 32 over the entire lengthwise length and the whole circumference length satisfies the above mentioned standard thickness. The determination result is displayed on a screen (not shown) and the like and is notified to the operator.

Because of the above configuration, the coating thickness inspection device 20 is capable of inspecting the thickness of the coating section 32 over the entire lengthwise length and the whole circumference length.

Figure 6:
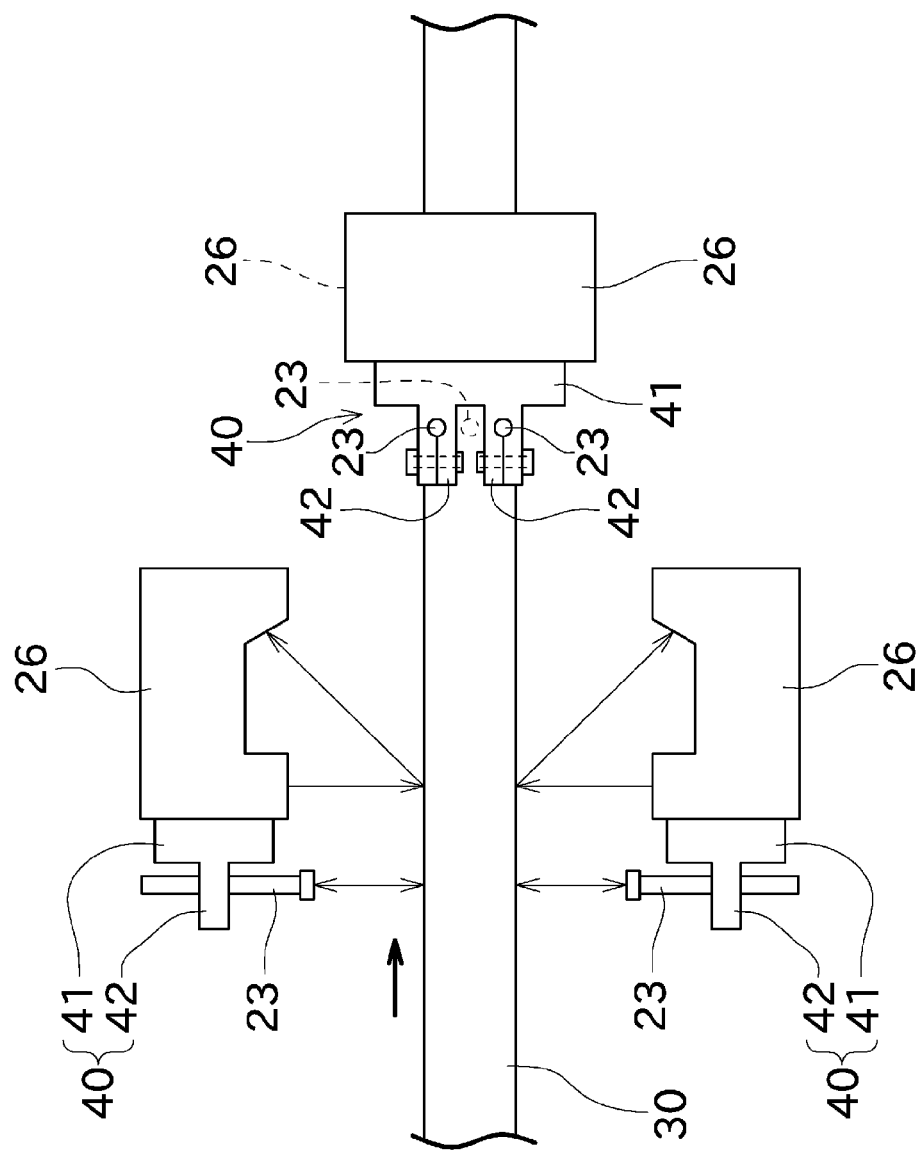
FIG. 6 A plan view showing the configuration of a coating thickness inspection device according to an another embodiment.

Next, an explanation will be given of an another embodiment in regard to the above embodiment with reference to a plan view (top view) of FIG. 6. In the explanation hereinafter, with regard to a configuration that has the same or similar configuration to that in the above embodiment, there are cases when an explanation is omitted and the same reference number is applied in figures.

In the above embodiment, positions in the lengthwise direction of the rectangular wire 30 of the five film thickness detecting units 23 are all the same. Whereas, in this another embodiment, as for the film thickness detecting units 23 for measuring left/right and the film thickness detecting units 23 for measuring vertically, positions thereof in the lengthwise direction of the rectangular wire 30 are different. As such, by varying positions in the lengthwise direction of the rectangular wire 30 with the film thickness detecting units 23, the possibility of scattered light, leakage light, reflection light and the like of laser irradiated from the film thickness detecting units 23 being achieved the light receiving parts of other film thickness detecting units 23 can be reduced. As for the two film thickness detecting units 23 for detecting left/right, the positions in the lengthwise direction of the rectangular wire 30 are the same, however, in order to reduce the possibility of laser from the one being received by the other, timings of irradiation of laser are made different from each other. The film thickness detecting units 23 that are arranged vertically are configured in the same way as above.

In the same manner as the film thickness detecting units 23, as for the displacement detecting units 26 for measuring left/right and the displacement detecting units 26 for measuring vertically, positions thereof in the lengthwise direction of the rectangular wire 30 are different. In the same manner as the film thickness detecting units 23, timings of irradiation of laser are made different from each other with regard to the two displacement detecting units 26 arranged left/right. Also, timings of irradiation of laser are made different from each other with regard to the two displacement detecting units 26 arranged vertically.

The layout shown in this another embodiment is just for an example. With regard to the film thickness detecting units 23 arranged left/right and vertically, the positions thereof in the lengthwise direction of the rectangular wire 30 can be different from each other. The same can be said of the layout of the displacement detecting units 26.

Next, an explanation will be given of an at least one attachment member 40 to which the film thickness detecting unit 23 and the displacement detecting unit 26 are attached. The attachment member 40 includes a first attachment part 41 and a second attachment part 42. The first attachment part 41 and the second attachment part 41 are provided in the same member, or provided in separate members that are relatively immovably fixed to each other. The displacement detecting unit 26 is attached to the first attachment part 41. An at least one attachment hole is formed in the second attachment part 42. The film thickness detecting unit 23 is attached to the second attachment part 42 by inserting the film thickness detecting unit 23 into the attachment hole and then tightening using bolts and the like. The attachment member 40 arranged on upper side includes one first attachment part 41 and two second attachment parts 42. The attachment member 40 arranged on lower side, left side, or right side includes one first attachment part 41 and one second attachment part 42.

As already mentioned above, in this embodiment, detection results of the film thickness detecting units 23 and the detection results of the displacement detection units 26 are superimposed (handled as being in the same coordinates). Accordingly, deviation that arose in superimposing the detection results can be reduced by relatively immovably fixing the film thickness detecting unit 23 and the displacement detection unit 26. It is preferable that the film thickness detecting unit 23 and the displacement detecting unit 26 for measuring any one of the four faces (for example, the upper face) of the rectangular wire 30 are relatively immovably fixed by at least the attachment member 40 and the like. As shown in FIG. 6, it is further preferable that every combination of the film thickness detecting unit 23 and the displacement detecting unit 26 is relatively immovably fixed.

Figure 7:
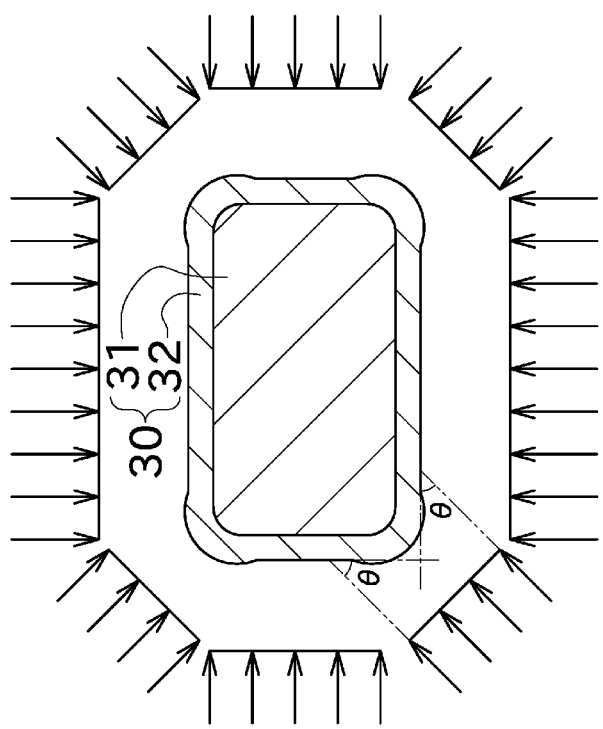
FIG. 7 A figure illustrating a laser further irradiated direction to calculate the external shape of the rectangular wire.

Since the coating thickness inspection device 20 includes the displacement gauge 25, the external shape of the rectangular wire 30 (coating section 32) can be measured by superimposing the detection results of the four displacement detection units 26. Since the swelling portions 32a are formed on the rectangular wire 30, in order to measure the external shape of the rectangular wire 30 in detail, it is preferable to add further displacement detection units 26. For example, as shown in FIG. 7, in addition to the directions that are perpendicular to the four sides of the rectangular wire, laser can be irradiated in the directions which form angles of θ degrees with respect to the four sides, so that the external shape of the rectangular wire 30 including the shape of the swelling parts 32a can be measured. Accordingly, it is preferable to add four further displacement detection units 26 (eight in total). Moreover, the angle of θ is preferably 45 degrees.

As explained above, the coating thickness inspection device 20 includes a displacement gauge 25, a position calculation unit 28a, and a determination unit 28b. The displacement gauge 25 measures the external shape of the rectangular wire 30 across the lengthwise direction of the rectangular wire 30 (external shape measurement step). The position calculation unit 28a determines the position of the rectangular conductor 31 within the rectangular wire 30 across the lengthwise direction of the rectangular wire 30 (position calculation step). The determination unit 28b determines whether the thickness across the peripheral direction of the coating section 32, as calculated on the basis of the results obtained by the displacement gauge 25 and the position calculation unit 28a and the size of the rectangular conductor 31, satisfies the standard thickness across the lengthwise direction of the rectangular wire 30 (determination step).

Accordingly, whether the thickness of the coating section 32 satisfies the standard thickness across the lengthwise direction and peripheral direction of the rectangular wire 30 can be inspected. As such, the highly reliable rectangular wire 30 securing sufficient insulation properties can be provided.

The coating thickness inspection device 20 of the present embodiment includes the film thickness gauge 22. The film thickness gauge 22 performs measurement of the thickness of the coating section 32 at at least one point per each of the four sides of the rectangular wire 30 (film thickness calculation step). The position calculation unit 28a utilizes the thickness of the coating section 32 measured by the film thickness gauge 22.

Accordingly, the position of the rectangular conductor 31 can be precisely calculated by means of using the film thickness gauge 22 capable of measuring the thickness of the coating section 32 at measuring points.

While some preferred embodiments of the present invention have been described above, the above-described configurations can be changed, for example, as follows.

The thickness of the coating section 32 can be measured by, instead of using the film thickness gauge 22 of above embodiment, using other type of measurement device that uses optical equipment (for example, laser equipment). Other type (ultrasonic waves, electromagnetic induction, and the like) of measurement device can be used for measuring the thickness of the coating section 32. Also, as for the displacement gauge 25, the external shape of the rectangular wire 30 can be measured by using other type of measurement device that uses laser, or by using other type of measurement device that does not use laser. Electromagnetic waves of any wavelength can be used for measurement that utilizes laser. For example, visible light, infrared radiation, X ray and the like can be used for measurement.

In the above embodiment, the position of the rectangular conductor 31 is calculated by measuring the thickness of the coating section 32 by the film thickness gauge 22, however, the position of the rectangular conductor 31 can also be calculated directly by using other method (for example, a method irradiating light that penetrates the coating section 32 but does not penetrate the rectangular conductor 31).

In the above embodiment, whether the thickness of the coating section 32 satisfies the standard thickness was determined after calculating the specific thickness over the entire lengthwise length and the whole circumference length of the rectangular wire 30, however, determining whether the thickness of the coating section 32 satisfies the standard thickness without calculating the specific thickness of the coating section 32 is also possible.

In the above embodiment, an uniform standard thickness is defined by the four sides of the rectangular wire 30, however, it is also possible to define respective standard thickness by the four sides that are different from each other. The standard thickness can be a thickness that defines the upper limit, lower limit, or upper and lower limit of the thickness of the coating section 32. For example, in the case where it is desired to prevent a decline of the space factor caused by exceed thickness of the coating section 32, it is preferable to define a standard thickness as a lower limit.

DESCRIPTION OF THE REFERENCE NUMERALS 10 rectangular wire manufacturing device
20 coating thickness inspection device
21 conveyance roller
22 film thickness gauge
23 film thickness detecting unit (thickness measuring unit)
24 film thickness processing unit
25 displacement gauge
26 displacement detecting unit (external shape measuring unit)
27 displacement processing unit
28 calculation unit
28a position calculation unit
28b determination unit
30 rectangular wire
31 rectangular conductor
32 coating section

The invention claimed is:

1. A method for inspecting, using a coating thickness inspection device, the thickness of a coating section of a rectangular wire that consists of a rectangular conductor having a narrow and long shape, cross-section of which has a rectangular shape, and a coating section coating the rectangular conductor, the method comprising:
an external shape measurement step for measuring an external shape of the rectangular wire across a lengthwise direction of the rectangular wire;
a position calculation step for determining the position of the rectangular conductor within the rectangular wire across the lengthwise direction of the rectangular wire;
a determination step for determining whether the thickness across a peripheral direction of the coating section as calculated on the basis of results obtained by the external shape measurement step and the position calculation step satisfies a standard thickness across the lengthwise direction; and
a thickness measurement step for measuring the thickness of the coating section at at least one point per each of the four sides of the rectangular wire, looking from the lengthwise direction of the rectangular wire,
wherein the thickness measurement step inspects the thickness of the coating section over an entire lengthwise length and a whole circumference length of the rectangular wire using the position of the rectangular conductor within the rectangular wire and results obtained by the external shape measurement step, and wherein the measurement result of the thickness measurement step is utilized to the calculation in the position calculation step.

2. The method for inspecting the thickness of the coating section according to claim 1, wherein, in the thickness measurement step, measurement of the thickness of the coating section is performed at an evading position above swelling portions that are formed on four corners of the coating section of the rectangular wire.

3. The method for inspecting the thickness of the coating section according to claim 1, wherein, in the thickness measurement step, the thickness of the coating section is measured at at least two points for one side among the four sides of the rectangular wire.

4. The method for inspecting the thickness of the coating section according to claim 1, wherein, in the thickness measurement step, laser is irradiated onto the rectangular wire in dots so that the thickness of the coating section is measured.

5. The method for inspecting the thickness of the coating section according to claim 1, wherein, in the thickness measurement step, the thickness of the coating section is measured by a thickness measurement part while moving the rectangular wire along the lengthwise direction.

6. The method for inspecting the thickness of the coating section according to claim 5, wherein, the position of the at least one of the thickness measurement parts in the lengthwise direction is different from that of any of the rest of the thickness measurement part.

7. The method of inspecting the thickness of the coating section according to claim 5, wherein, timing of irradiating laser from the at least one of the thickness measurement parts is different from that of any of the rest of the thickness measuring part.

8. The method of inspecting the thickness of the coating section according to claim 7, wherein, looking from the lengthwise direction, with regard to lasers irradiated onto the long sides of the rectangular wire from the thickness measurement parts, the directions of irradiation of lasers are parallel to each other, and with regard to lasers irradiated onto the short sides of the rectangular wire from the thickness measurement parts, the directions of irradiation of lasers are parallel to each other, wherein, lasers irradiated onto the long sides and lasers irradiated onto the short sides are perpendicular to each other.

9. The method of inspecting the thickness of the coating section according to claim 1, wherein, in the external shape measurement step, the external shape of the rectangular wire is measured by irradiating lasers to the four sides of the rectangular wire in lines from external shape measurement parts, while moving the rectangular wire in the lengthwise direction.

10. The method of inspecting the thickness of the coating section according to claim 9, wherein, the position of the at least one of the external shape measurement part in the lengthwise direction is different from that of any of the rest of the external shape measurement part.

11. The method of inspecting the thickness of the coating section according to claim 10, wherein, among four pairs of a thickness measurement part and an external shape measurement part that are intended to measure the same side of the rectangular wire, with regard to the at least one of the pairs, the thickness measurement part and the external shape measurement part are relatively immovably fixed.

12. The method of inspecting the thickness of the coating section according to claim 9, wherein, timing of irradiating laser from the at least one of the external shape measurement parts is different from that of any of the rest of the external shape measurement part.

13. The method of inspecting the thickness of the coating section according to claim 9, wherein, looking from the lengthwise direction, with regard to lasers irradiated onto the long sides of the rectangular wire from the external shape measurement parts, the directions of irradiation of lasers are parallel to each other, and with regard to lasers irradiated onto the short sides of the rectangular wire from the external shape measurement parts, the directions of irradiation of the lasers are parallel to each other, wherein, lasers irradiated onto the long sides and lasers irradiated onto the short sides are perpendicular to each other.

14. The method of inspecting the thickness of the coating section according to claim 1, wherein, the external shape measurement step, the position calculation step, and the determination step are performed with a manufacturing step of the rectangular wire in a series of flow.

15. A coating thickness inspection device for inspecting the thickness of a coating section of a rectangular wire, the rectangular wire consisting of a rectangular conductor having a narrow and long shape, cross-section of which has a rectangular shape, and the coating section coating the rectangular conductor, comprising:

an external shape measurement part for measuring an external shape of the rectangular wire across a lengthwise direction of the rectangular wire;

a position calculation part for determining the position of the rectangular conductor within the rectangular wire across the lengthwise direction of the rectangular wire;

a determination part for determining whether the thickness across a peripheral direction of the coating section as calculated on the basis of the results obtained by the external shape measurement part and the position calculation part and a size of the rectangular conductor satisfies a standard thickness across the lengthwise direction; and a thickness measurement part for measuring the thickness of the coating section at at least one point per each of the four sides of the rectangular wire, looking from the lengthwise direction of the rectangular wire, wherein the thickness measurement part inspects the thickness of the coating section over an entire lengthwise length and a whole circumference length of the rectangular wire using the position of the rectangular conductor within the rectangular wire and results obtained by the external shape measurement part.

* * * * *